United States Patent
Imai et al.

(10) Patent No.: US 6,389,153 B1
(45) Date of Patent: May 14, 2002

(54) DISTANCE INFORMATION GENERATOR AND DISPLAY DEVICE USING GENERATED DISTANCE INFORMATION

(75) Inventors: Shigeaki Imai, Uji; Akira Sato, Shiga-Ken; Takashi Kondo, Sakai; Tokuji Ishida, Daito, all of (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/158,885

(22) Filed: Sep. 23, 1998

(30) Foreign Application Priority Data

Sep. 26, 1997 (JP) .............................. 9-261268

(51) Int. Cl.⁷ ................................................ G06K 9/00
(52) U.S. Cl. ...................... 382/106; 356/614; 356/615; 356/623; 356/624
(58) Field of Search ............................... 364/3; 348/47, 348/38; 345/8; 356/614, 623, 624, 615; 382/106

(56) References Cited

U.S. PATENT DOCUMENTS

| | | | |
|---|---|---|---|
| 4,136,949 A | * 1/1979 | Hayamizu et al. | 356/1 |
| 4,556,986 A | * 12/1985 | Craig | 382/42 |
| 5,486,841 A | * 1/1996 | Hara et al. | 345/8 |
| 5,576,975 A | * 11/1996 | Sasaki et al. | 364/561 |
| 5,973,726 A | * 10/1999 | Iijima et al. | 348/38 |
| 5,975,015 A | * 11/1999 | Ishibashi et al. | 348/47 |
| 5,999,840 A | * 12/1999 | Grimson et al. | 600/424 |

OTHER PUBLICATIONS

O Shinsuke Suzuki et al, "Design of visual display for augemented reality–fusion of real and virtual space image using depth from viewpoint," proceeding of the 35th SICE annual conference, domestic session paper, vol. I, 107 D–2, Jul. 24–26, 1996, pp. 2.*

Matthias M. Wloka et al., "Resolving Occlusion in Augmented Reality," Proceedings of 1995 Symposium on Interactive 3D Graphics, (Apr. 1995), pp. 5–12.

O Shinsuke Suzuki et al., "Design of Visual Display for Augmented Reality—Fusion of Real and Virtual Space Image Using Depth from Viewpoint," Proceedings of the 35th SICE Annual Conference, Domestic Session Papers, vol. I, 107 D–2 (with English translation thereof), Jul. 24–26, 1996, pp. 211 and 212.

* cited by examiner

*Primary Examiner*—Leo Boudreau
*Assistant Examiner*—M B Choobin
(74) *Attorney, Agent, or Firm*—Burns, Doane, Swecker & Mathis, LLP

(57) ABSTRACT

A distance information generator comprises an image sensor which senses an object, a distance detector which detects a first distance between a predetermined position and the object, a memory which stores position information expressing a mutual positional relationship of the predetermined position and the position of the image sensor, and a calculator which calculates a second distance between the position of the image sensor and the object based on the first distance and the position information. A display device displays a composite image which consists of a sensed image and a virtual image for an observer, wherein the composite image is created by comparing the second distance and distance information involved in the virtual image.

11 Claims, 13 Drawing Sheets

Fig.7
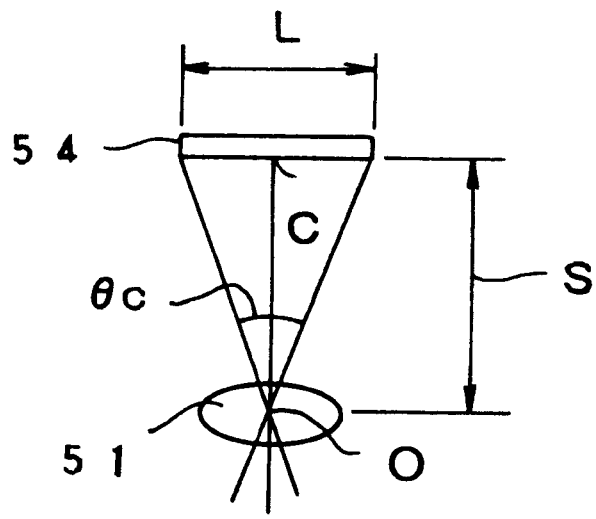
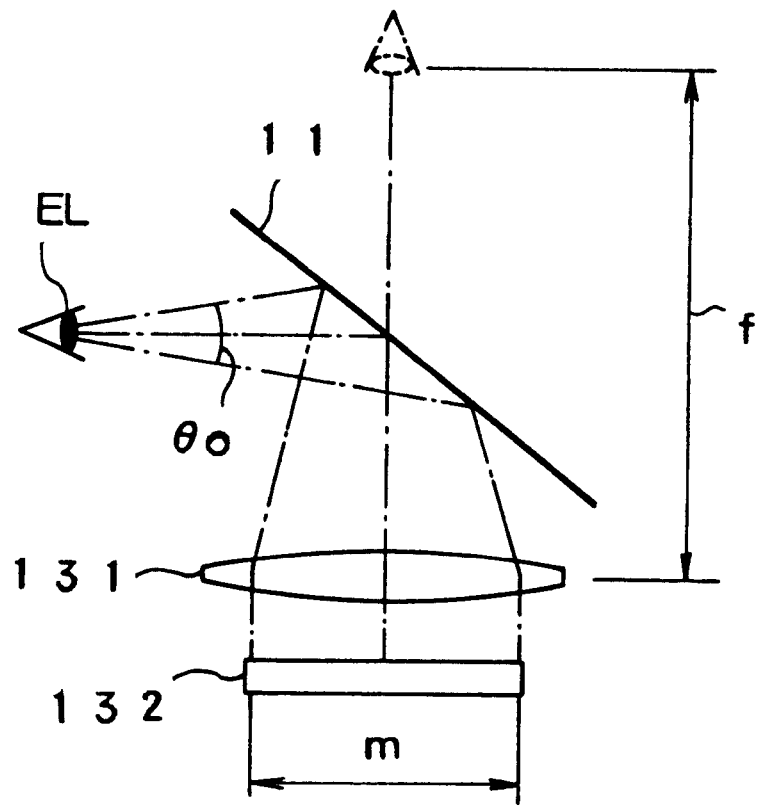

DISTANCE INFORMATION GENERATOR AND DISPLAY DEVICE USING GENERATED DISTANCE INFORMATION

RELATED APPLICATIONS

This application is based on Application No. HEI 9-261268 filed in Japan, the content of which is hereby incorporated by reference.

BACKGROUND OF THE INVENTION

1. Field of the Invention

The present invention relates to a display device for displaying images, for example, to generate a distance image in real space relative to the viewpoint of an observer in augmented reality (AR), and to display an AR image based on a generated distance image.

2. Description of the Related Art

The art of influencing human perception to present an environment as if in the real world by presenting computer-generated information to a person is known as virtual reality (VR). The art of virtual reality allows a person to enter and experience an virtual environment as if in the real world. Virtual reality is also known as artificial reality.

Augmented reality (hereinafter referred to as "AR") is one area in the field of virtual reality technology. In the field of augmented reality, real space and computer-generated virtual space are mixed and presented to the viewer. In augmented reality, real space is enhanced by virtual space.

In AR technology the purpose is to heighten the quality of real space by suitably arranging an virtual environment in a real environment, whereas the purpose of VR technology is to completely immerse a person in a virtual environment. The presentation of a image as an virtual environment is visual AR. Hereinafter AR refers to to as "visual AR."

Examples of the uses considered for AR technology include systems which superimpose the image from a patient's brain CT scan on the actual brain of the patient during surgery, systems supporting work such as assembly and repairs and the annotation of parts of an actual mechanical device by computer graphics, systems which evaluate the impression of how furniture will look in an actual room, and systems which evaluate sights at actual locales and at actual size when urban redevelopment programs build new buildings.

AR technology typically uses a head-mounted display (HMD) to present both actual space and virtual space to a person simultaneously. Head-mounted displays include those using optical systems and those using video signals.

FIG. 13 illustrates the principle of AR system 80 using a conventional optical system type head-mounted display, and FIG. 14 illustrates the principle of AR system 90 using a conventional video signal type head-mounted display. In AR system 80 shown in FIG. 13, a real space image is transmitted through a half mirror 81 arranged on the line of sight in front of the eyes of an observer so as to be viewed by the observer, and a virtual space image projected by a projector 82 is viewed via half mirror 81 so as to be viewed by the observer. In this way a virtual space image overlaps a real space image. A position/posture sensor 83 is provided to detect the observation point of the head of an observer; the signals of a virtual space image are transmitted from a workstation 84 to projector 82 based on the output of the position/posture sensor 83.

In AR system 90 shown in FIG. 14, a real space image is projected by double mirror 91 to two image sensors 93 arranged at conjugate positions relative to the right and left eyes of an observer. The projected real space image and a virtual space image are combined by workstation 95, and the composite image is projected by projector 92. As a result, the composite image of the combined real space image and the virtual space image is presented to the observer via double mirror 91.

To realize augmented reality (AR), there is, in addition to the conventional problem of specifying positional matching of the images, the requirement of accurately expressing the screening relationship. In both the aforesaid AR system 80 and 90, there must be accurate expression of the screening relationship wherein space and objects far from the observer are screened by space and objects near the observer.

In the former AR system 80, real space is visible behind objects in virtual space, such that an observer sees both the images of virtual space and real space simply overlapped. In this system, however, the screening relationship cannot be expressed completely.

In the latter AR system 90, there is no distance relationship and objects in virtual space typically hide objects in real space, such that a screening relationship cannot be accurately expressed. That is, although the screening relationship is accurate when objects in virtual space are nearer than objects in real space, objects in virtual space block objects in real space such that the objects in real space appear far away even when they are at near positions, and the screening relationship is reversed.

According to opinion in perceptual psychology, in the state wherein a screening relationship cannot be accurately manifested, stereo vision is obstructed and unexpected stereo vision results due to the contradiction between vergence-parallax information and the screening relationship. In other words, accurate expression of the screening relationship is extremely important in the art of augmented reality.

The present applicants have come up with a head-mounted display capable of accurately expressing screening relationship. In this head-mounted display, the distance of a virtual space image and the distance of a real space image are compared relative to the pixels of the virtual space image and pixels of the real space image at the same position so as to select and display the pixels nearer to the observer.

FIG. 15 is a perspective view of the exterior of the previously mentioned head-mounted display (HMD) 70.

In HMD 70, slit projectors 71R and 71L are respectively arranged at positions near the right and left eye of an observer to measure the distance to an observation object from the viewpoint of the observer. The reflected light of slit light UR and UL projected from the two slit projectors 71R and 71L is received by photoreceptors 73R and 73L disposed at each image sensor 72R and 72L of HMD 70, so as to obtain accurate distance information of each pixel of a the right and left two-dimensional images (real space images). The screening relationship can be accurately expressed based on the right and left distance information.

In the HMD 70 of FIG. 15, however, the slit projectors 71R and 71L must be positioned near the right and left eye, respectively thereby complicating the construction of the disposition and mounting, and enlarging the overall head-mounted device 70.

In particular, since the HMD 70 is an active type device, photoreceptors 73R and 73L are required which are separate from the photoreceptor device for inputting the two-dimensional images so as to receive the slit light UR and UL projected from slit projectors 71R and 71L, thereby making it difficult to accurately match the lines of sight.

SUMMARY OF THE INVENTION

An object of the present invention is to eliminate the previously described disadvantages.

A further object of the present invention is to provide a distance image generating device capable of increasing the freedom of arrangement of a distance detector, and capable of obtaining distance information which matches the line of sight of an input two-dimensional image based on distance information from a different position than the line of sight of the input two-dimensional image by generating other necessary distance information based on distance information measured by a single distance detector.

A still further object of the present invention is to provide a compact head-mounted device capable of obtaining binocular distance information from distance information measured by a distance detector provided at a position near one eye.

The invention itself, together with further objects and attendant advantages, will be best understood by reference to the following detailed description taken in conjunction with the accompanying drawings.

BRIEF DESCRIPTION OF THE DRAWINGS

FIG. 7 illustrates the field angle of the image sensing system and display system;

In the following description, like parts are designated by like reference numbers throughout the several drawings.

DESCRIPTION OF THE PREFERRED EMBODIMENTS

The present invention is described hereinafter by way of the preferred embodiments.

Figure 1:
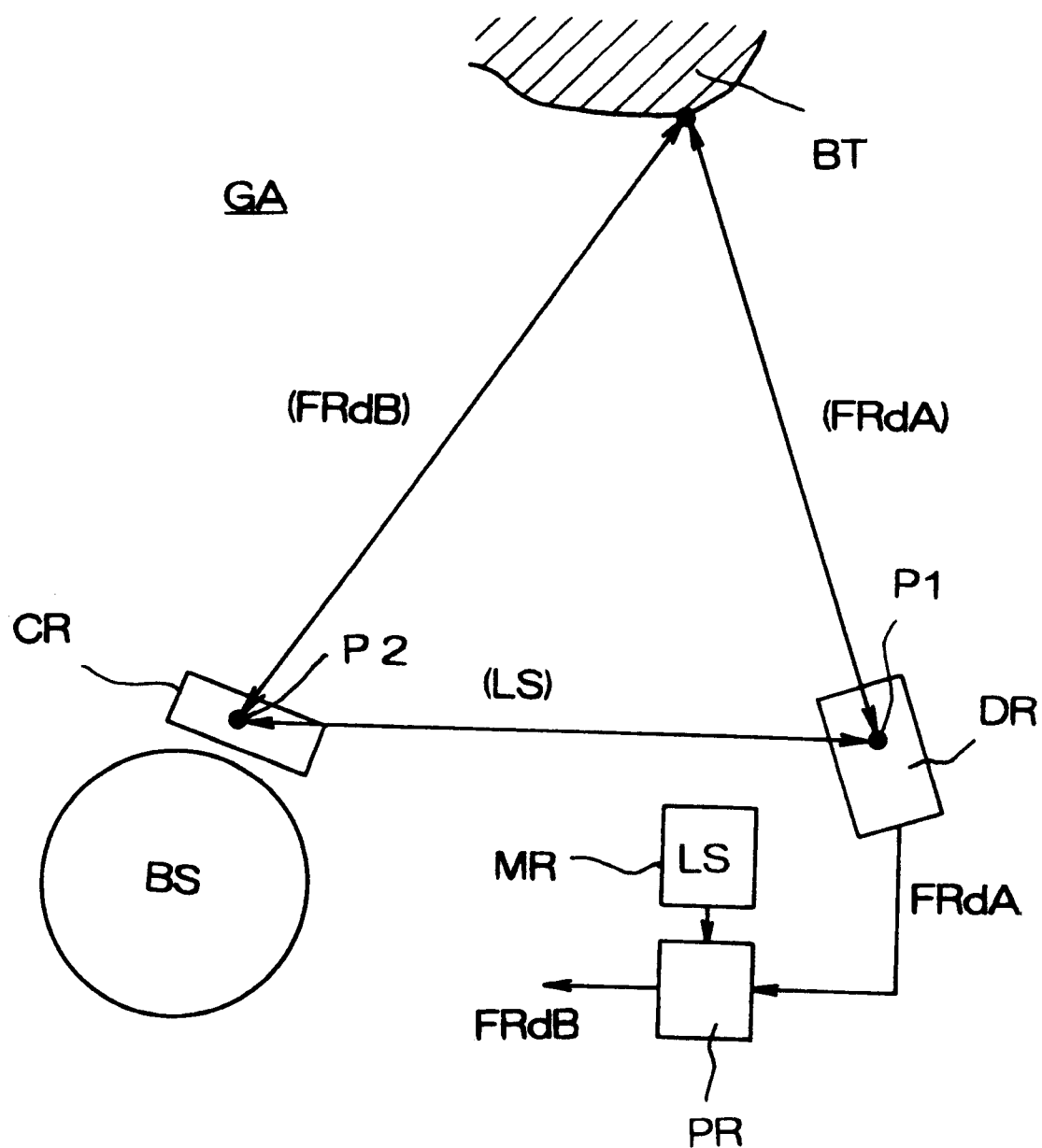
FIG. 1 illustrates the principle for obtaining distance information.

FIG. 1 illustrates the principle for obtaining distance information.

In FIG. 1, the image sensor CR which senses a two-dimensional image (real space image) of viewing object BT is arranged, for example, so as to match the line of sight of the observer BS. Distance detector DR is disposed at position P1 separated from image sensor CR by a known distance.

The distance from position P1 to the viewing object BT is measured by distance detector DR to obtain distance information FRdA. Distance information FRDA is transmitted to calculator PR. The relative positional relationship of position P1 and position P2 is stored in memory MR as position information LS.

Calculator PR calculates the distance from position P2 of image sensor CR to the viewing object BT based on the input distance information FRdA and position information LS, and outputs the calculation result as distance information FRdB. In this way the distance information FRdB as viewed from position P2 of image sensor CR is obtained regardless of the fact that distance detector DR is positioned so as to be separated from image sensor CR.

Image sensor CR is disposed at a position that matches the line of sight of the eyes of the observer, but is otherwise optionally positioned. Distance detector DR is disposed at a position near one eye of observer BS, but is otherwise optionally positioned. Position information LS is information on absolute positions of image sensor CR and distance detector DR, and information on the relative positions (positional difference) of the same. Position information LS is predetermined fixed information when image sensor CR and distance detector DR are disposed at fixed positions, and is variable information corresponding to relative positions when either one or both image sensor CR and distance detector DR are movable.

Figure 2:
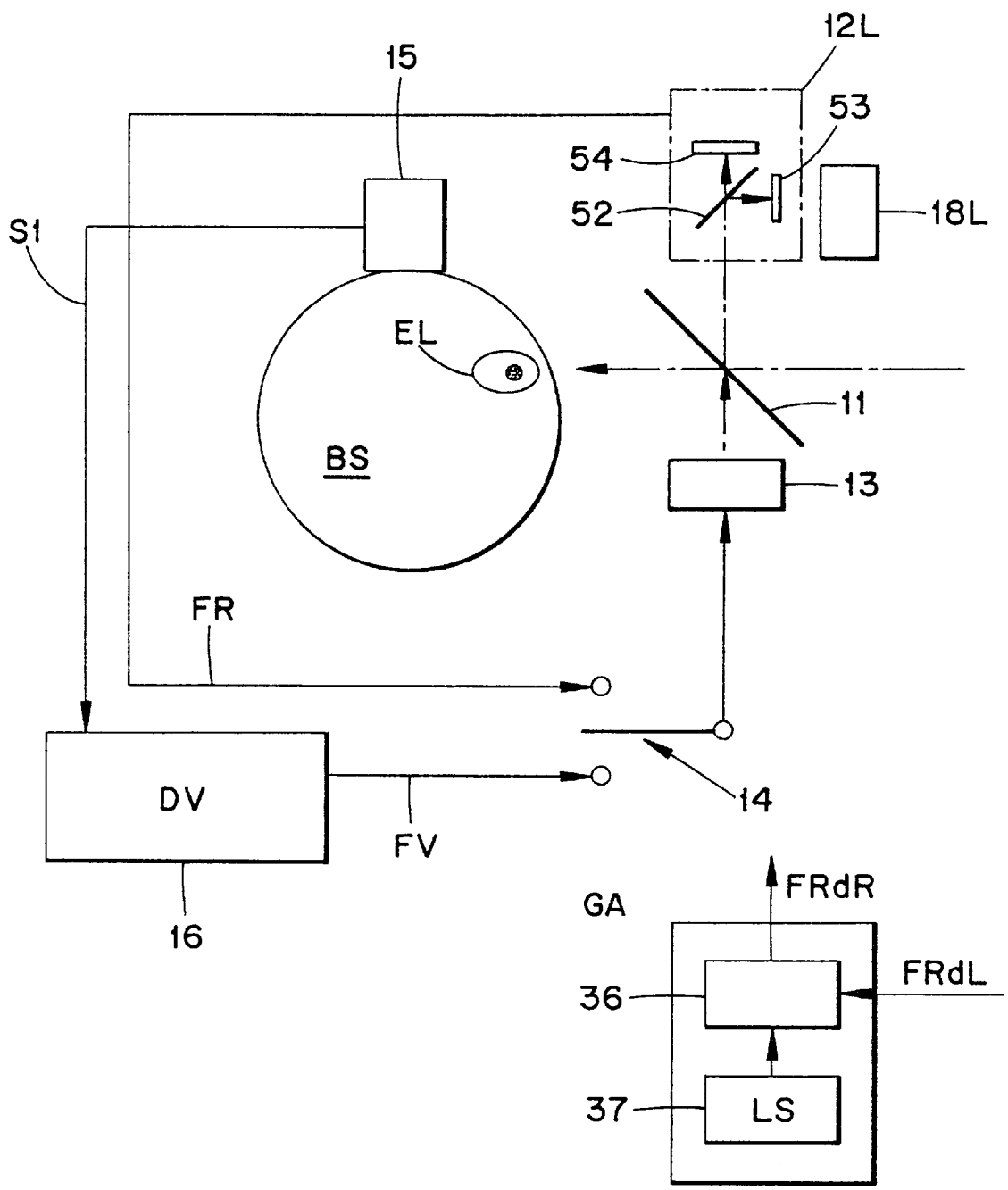
FIG. 2 is a block diagram showing the construction of the display device.
Figure 3:
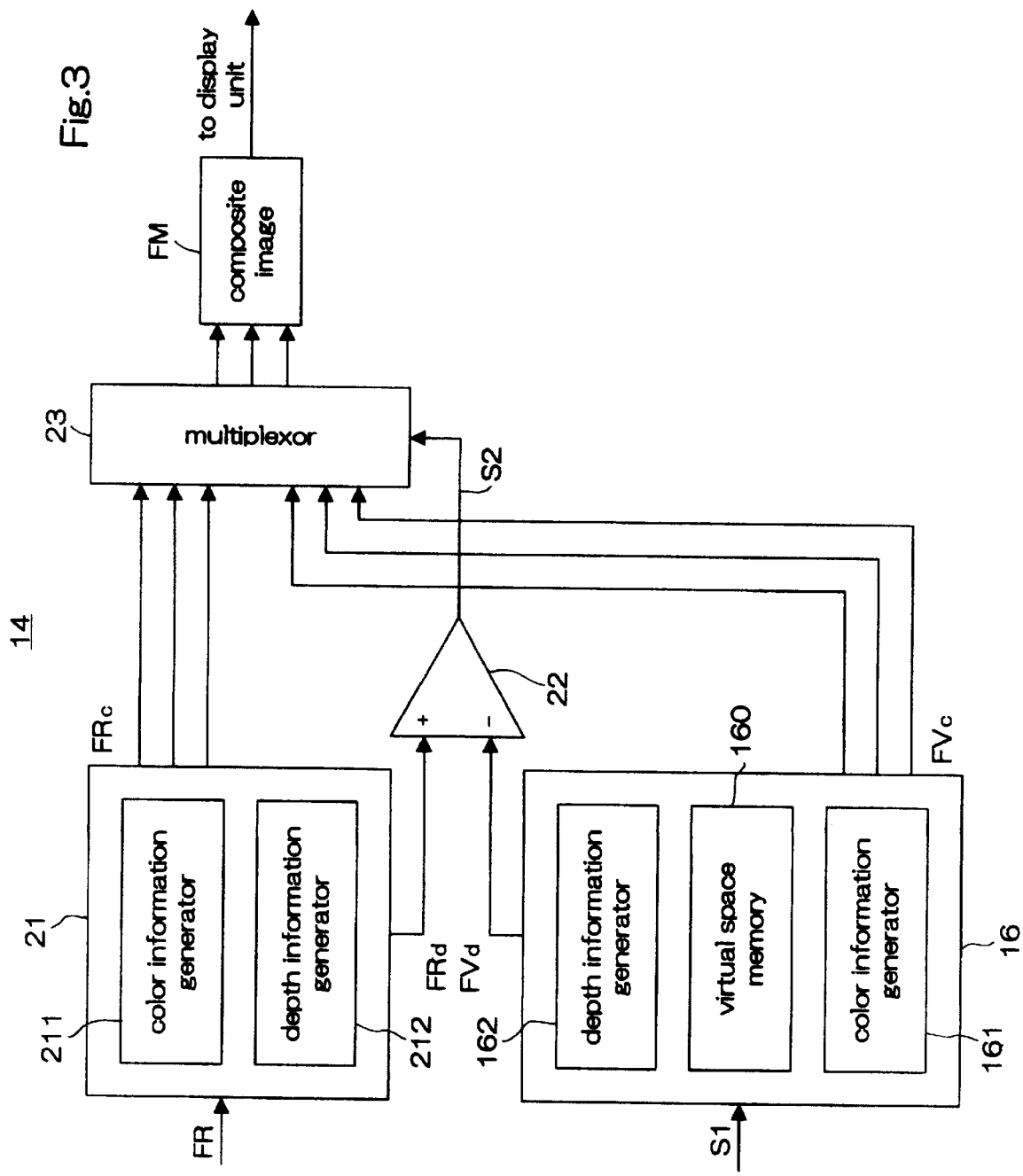
FIG. 3 is a block diagram showing the construction of the screening pixel switching unit of the display device.

FIG. 2 is a block diagram briefly showing the theoretical construction of display device 1 of the present invention. FIG. 3 is a block diagram showing the construction of screening pixel switching unit 14 of display device 1. In the drawings, components used for the right eye have the symbol "R" appended, and components used for the left eye have "L" appended when it is particularly necessary to differentiate the components used for the right and left eyes. FIG. 2 shows the left eye image sensor 12L and slit projector 18L.

In FIG. 2, display device 1 comprises mirror 11, image sensor 12, slit projector 18, display 13, screening pixel switching unit 14, position sensor (position/posture sensor) 15, virtual space image output unit 16 and the like. Mirror 11, image sensor 12, and display 13 are provided for left and right eyes El and ER. Image sensor 12 differs in construction between left eye image sensor 12L and right eye image sensor 12R. Slit projector 18 is provided only for the left eye, and its position is near the outside of right eye ER.

Mirror 11 has a reflective surface on both surfaces, and is disposed in front of left and right eyes EL and ER of observer BS at a 45 degree angle relative to the respective lines of sight.

Image sensor 12 is provided with a color sensor 54 disposed at a position optically conjugate with each eye EL and ER of observer BS. Therefore, the viewpoints of the respective left and right eyes EL and ER and each image sensor 12L and 12R are aligned. Color sensor 54 reads the real space image FR reflected in mirror 11. Of the two image sensors 12, the left image sensor 12L is provided with a measuring sensor 53. Measuring sensor 53 receives the light reflected by the viewing object BT of slit light U projected from slit projector 18L, and generates depth information (distance information) when viewing object BT from the left eye EL. In image sensor 12L is provided with an infrared reflective mirror 52 between color sensor 54 and measuring sensor 53 to split the light into visible light and infrared light. Details are provided later.

The position information LS expressing the mutual positional relationship of the image sensing unit 12R position and the image sensing unit 12L position is stored in viewpoint data memory 37. Viewpoint conversion circuit 36 calculates the depth information (distance information) FRdR when viewing the object BT from the right eye ER based on the left eye distance information FRdL and position information LS.

Display 13 displays the composite image FM output from screening pixel switching unit 14. The observer BS views the composite image FM displayed on display 13 via mirror 11. Image sensor 12 and display 13 are arranged on essentially the same line of sight as the line of sight of observer BS. Various conventional and well-known displays may be used as display 13, e.g., liquid crystal panel, CRT and the like. Various types of lenses and mirrors may be used as necessary.

Screening pixel switching unit 14 switches and outputs the real space image FR and virtual space image FV for each pixel in accordance with the distance (depth) from the viewpoint of observer BS based on the aforesaid distance information FRdL and FRdR. Details are described later.

Position sensor 15 detects the position and posture of observer BS, and the viewpoint of observer BS is detected based on the output signal S1 from the sensor 15. The detection of viewpoint based on position sensor 15 and signal Si is a well-known method.

Virtual image output unit 16 outputs virtual image FV and virtual distance image FVd of distance information corresponding to each pixel of image FV based on virtual space information DV pre-stored in memory and signal SI output from position sensor 15. Various types of information such as image data sensed via various methods, image data generated by computer graphics, and programs for generating such image data may be used as virtual space information DV.

Screening pixel switching unit 14 and virtual image output unit 16 may be realized by suitable hardware, or executing programs installed in a suitable processing unit such as a workstation, personal computer and the like, or combinations thereof. Such programs are stored in random access memory (RAM), read only memory (ROM), hard disk device and the like, or may be read from a recording medium such as CD-ROM, magneto optic disk, floppy disk device or the like, or may be downloaded from a host via a communications line. The programs can be supplied for various operating systems, systems environments, and may operate on various platforms.

In display device 1, the viewpoint distance coordinates are calculated by a method described later based on the real space image FR from image sensor 12 at a position optically conjugate with left and right eyes EL and ER of observer BS, so as to generate a composite image FM by switching each pixel of virtual space image FV and real space image FR in accordance with the distance from the viewpoint, and display the composite image FM to observer BS.

In general, the Z buffer method is used to accurately express screening relationships in computer graphics. A so-called Z-key method has been proposed to express screening relationship between both real space and virtual space using this same method. This method switches and displays real space and virtual space by the Z coordinate value in a camera coordinate system. Screening pixel switching unit 14 uses this Z-key method, and advances this method.

In FIG. 3, screening pixel switching unit 14 is provided with a real image output unit 21, comparator 22, and selector 23.

Real image output unit 21 is provided with a color information generator 211, and depth information generator 212. Color information generator 211 generates color information FRc based on real space image FR read by color sensor 54. Depth information generator 212 generates depth information (distance information) FRd corresponding to each pixel of real space image FR based on distance information output from measuring sensor 53. Since depth information FRd corresponds to the real space distance image, the depth information FRd is recorded as real space distance image FRd. Color information FRc is identical to real space image FR.

In FIG. 3, virtual image output unit 16 is provided with a virtual space memory 160, color information generator 161, and depth information generator 162. Virtual space information DV is stored in virtual space memory 160. Color information generator 161 generates color information FVc based on signal Si and virtual space information DV. Depth information generator 162 generates depth information (distance information) FVd corresponding to each pixel of color information FVc based on signals SI and virtual space information DV. Since depth information FVd corresponds to the virtual space distance image, depth information FVd is recorded as virtual space distance image FVd. Color information FVc is identical to virtual space image FV.

Comparator 22 compares each pixel of real space distance image FRd with each pixel of virtual space distance image FVd, and outputs the comparison result as signal S2.

Selector 23 selects image data of pixels in the direction nearest the viewpoint among the real space image FR and the virtual space image FV based on signal S2 from comparator 22. Accordingly, selector 23 outputs a composite image FM combining the image data of pixels in the direction nearest the viewpoint among the real space image FR and the virtual space image FV.

In display device 1, using screening pixel selector 14 makes it unnecessary to estimate the solid structure of real space when fusing real space and virtual space. That is, expressing real space image FR and virtual space image FV by color information FRc and FVc and depth information FRd and FVd for each pixel allows accurate fusion of both images by electric signals using the previously described simple circuit. This characteristic of determining the real time processing of augmented reality by the application is extremely advantageous.

In order to apply the Z-key to augmented reality it is necessary to measure the distance image from the viewpoint coordinate system in real time. The method of measuring the distance image and calculation method included in display device 1 of the present embodiment are described in detail below by way of specific examples.

Figure 4:
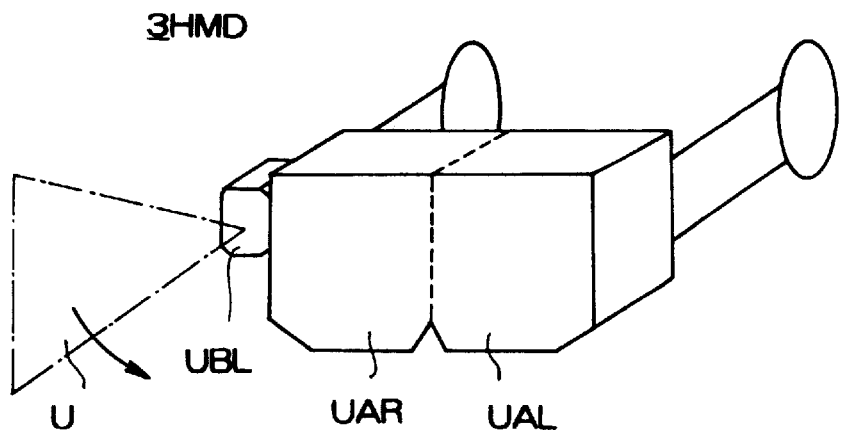
FIG. 4 is a perspective view of the exterior of the display device.

FIG. 4 is a perspective view showing the exterior of head-mounted display (HMD) 3 as one example of display device 1.

HMD 3 comprises a left eye display/image sensing unit UAL for obtaining distance information and image of the scenery of the physical world to display a virtual image to the left eye EL of observer BS, a right eye display/image sensing unit UAR for obtaining an image of the scenery of the physical world to display a virtual image to the right eye ER of observer BS, and left eye slit projector UBL for projecting slit light U to measure the left eye distance. Slit light U projected from slit projector UBL is infrared light.

Left slit projector UBL is arranged at the edge of the right side of right display/image sensing unit UAR to increase the baseline length for distance measuring. The previously mentioned position sensor 15 is provided above HMD 3.

Figure 5:
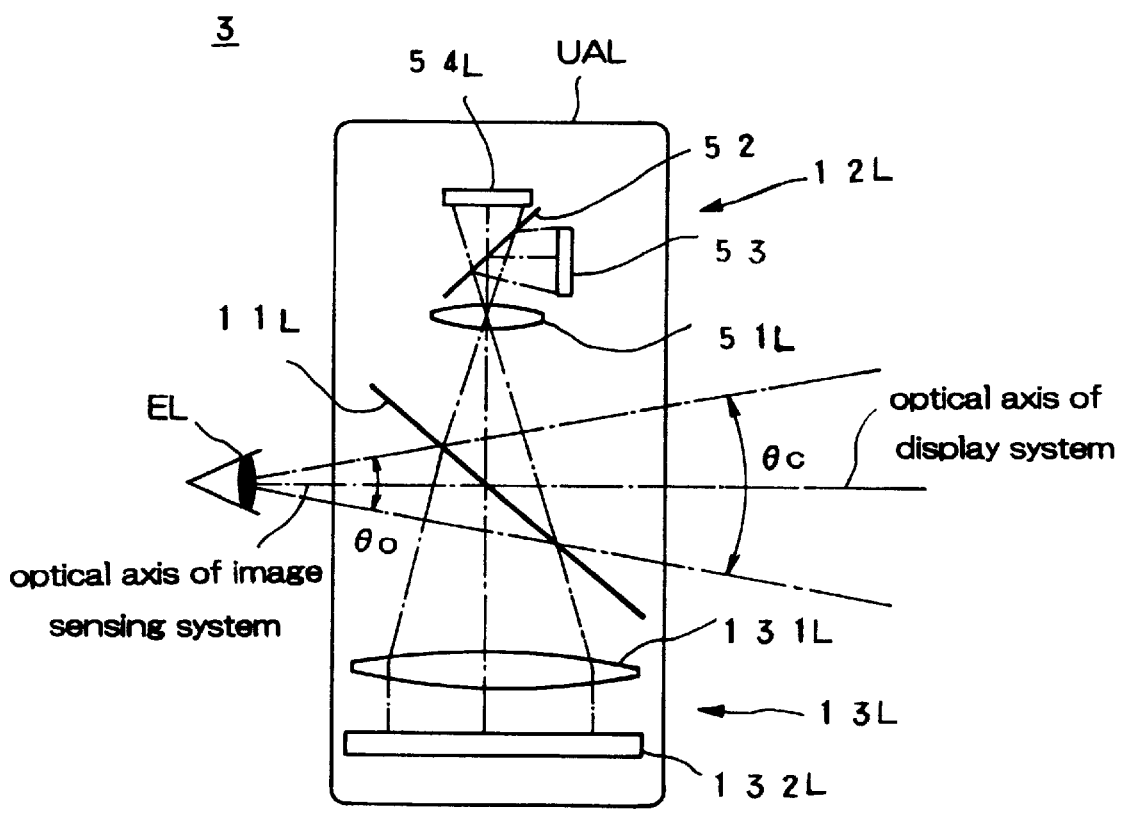
FIG. 5 shows the construction of the optical system of the left eye display/image sensor unit.
Figure 6:
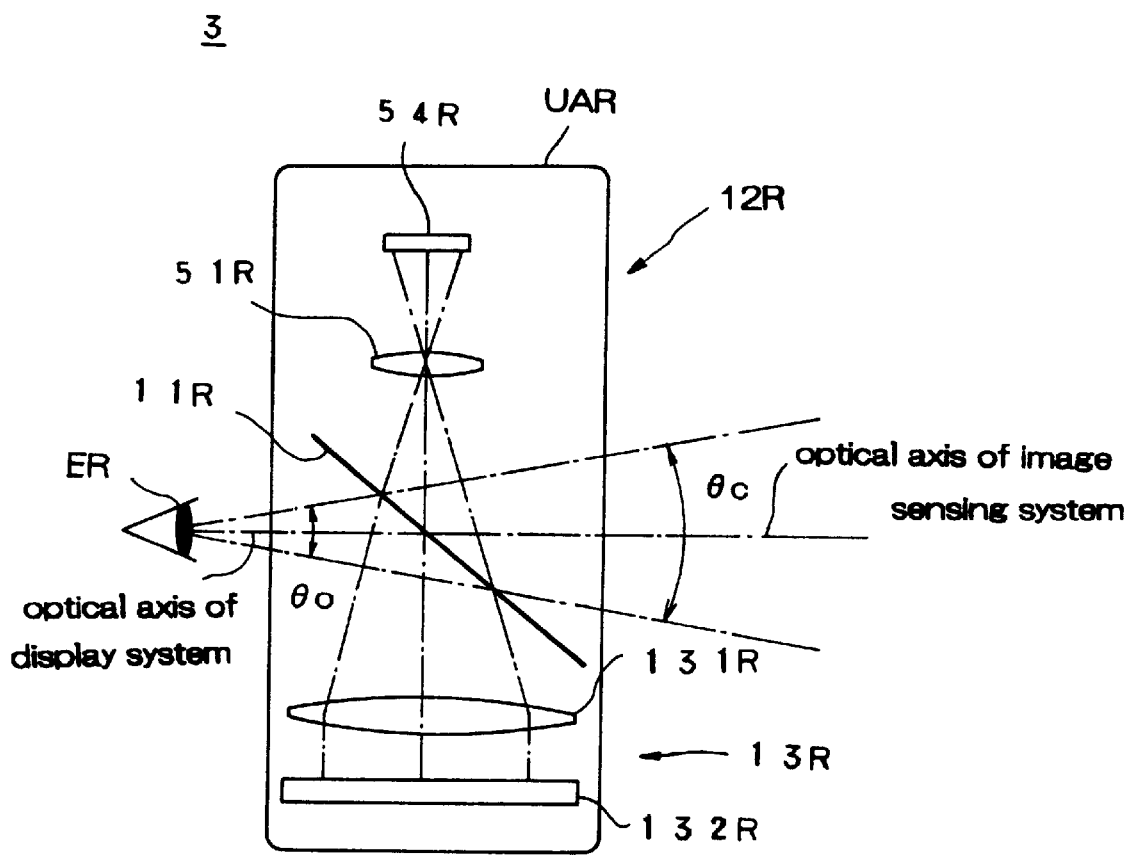
FIG. 6 shows the construction of the optical system of the right eye display/image sensor unit.

FIG. 5 shows the construction of the optical system of left display/image sensing unit UAL, FIG. 6 shows the construction of the optical system of right display/image sensing unit UAR, and FIG. 7 illustrates the field angles of the image sensing system and the display system. In FIGS. 5 and 6, elements having the same function as elements shown in FIG. 2 are designated by identical reference numbers.

In FIG. 5, left display/image sensing unit UAL is provided with image sensor 12L and display unit 13L.

Image sensor 12L comprises a photographic lens (photographic lens unit) 51L, infrared reflecting mirror 52, measuring sensor 53, and color sensor 54L. The image of physical world scenery is reflected by mirror 11L, then condensed by photographic lens 51L, transmitted through infrared reflecting mirror 52, and forms an image on color sensor 54L. The slit image created by slit projector UBL is reflected by mirror 11L, then condensed by photographic lens 51L, reflected by infrared reflecting mirror 52, and forms an image on measuring sensor 53. Distance information FRdL is output from measuring sensor 53, and the previously described triangular distance calculation is executed based on the distance information FRdL.

Display 13L comprises an eyepiece optical unit 131L, and display device 132L. The observer BS views the image displayed on display device 132L through eyepiece optical unit 131L and mirror 11L as a virtual image enlarged to a distance from 1 meter to infinity.

The axis passing through the principal point of photographic lens 51L and the center point of color sensor 54L is set as the optical axis of the image sensing system, and the axis passing through the principal point of eyepiece optical unit 131L and the point on display device 132L corresponding to the center point of color sensor 54L is set as the optical axis of the display system.

At this time, the optical axis of the display system and the optical axis of the image sensing system are near linear so as to have the viewpoint of the observer BS match the optical axis of the image sensing system. The position of the pupil of observer BS is on the optical axis of the display optical system. The optical axis passing through the principal point of photographic lens 51L and the center point of measuring sensor 53 also matches the optical axis of the image sensing system, so as to readily achieve correspondence of the real space image FR obtained from color sensor 54L and the real space distance image FRdL obtained from measuring sensor 53.

Image sensor 12L and display 13L essentially match field angle (field of view angle) θo viewed by the observer BS, and field angle θc of image sensor 12L.

As shown in FIG. 7, the distance from the principal point O of photographic lens 51L to the center point C of color sensor 54L is designated S, and the size of the image sensing plane of color sensor 54L is designated L. The size of the display plane of display device 132L is designated m, and the focal length of eyepiece optical unit 131L is designated f. As shown in FIG. 7, the left eye EL of observer BS becomes the focal point position of eyepiece optical unit 131L so as to be telecentric on the display device 132L side.

At this time, when the arrangement of components satisfies the equation L/S=m/f, the fields of view θo and field angle θc match. Image sensor 12L and display 13L are arranged to satisfy the equation, and observer BS is able to view the actual world without feeling uneasiness.

As shown in FIG. 6, the right display/image sensing unit UAR is not provided with the infrared reflecting mirror 52 and measuring sensor 53 of left display/image sensing unit UAL, but in other respects the construction is identical to that of left display/image sensing unit UAL.

Figure 8:
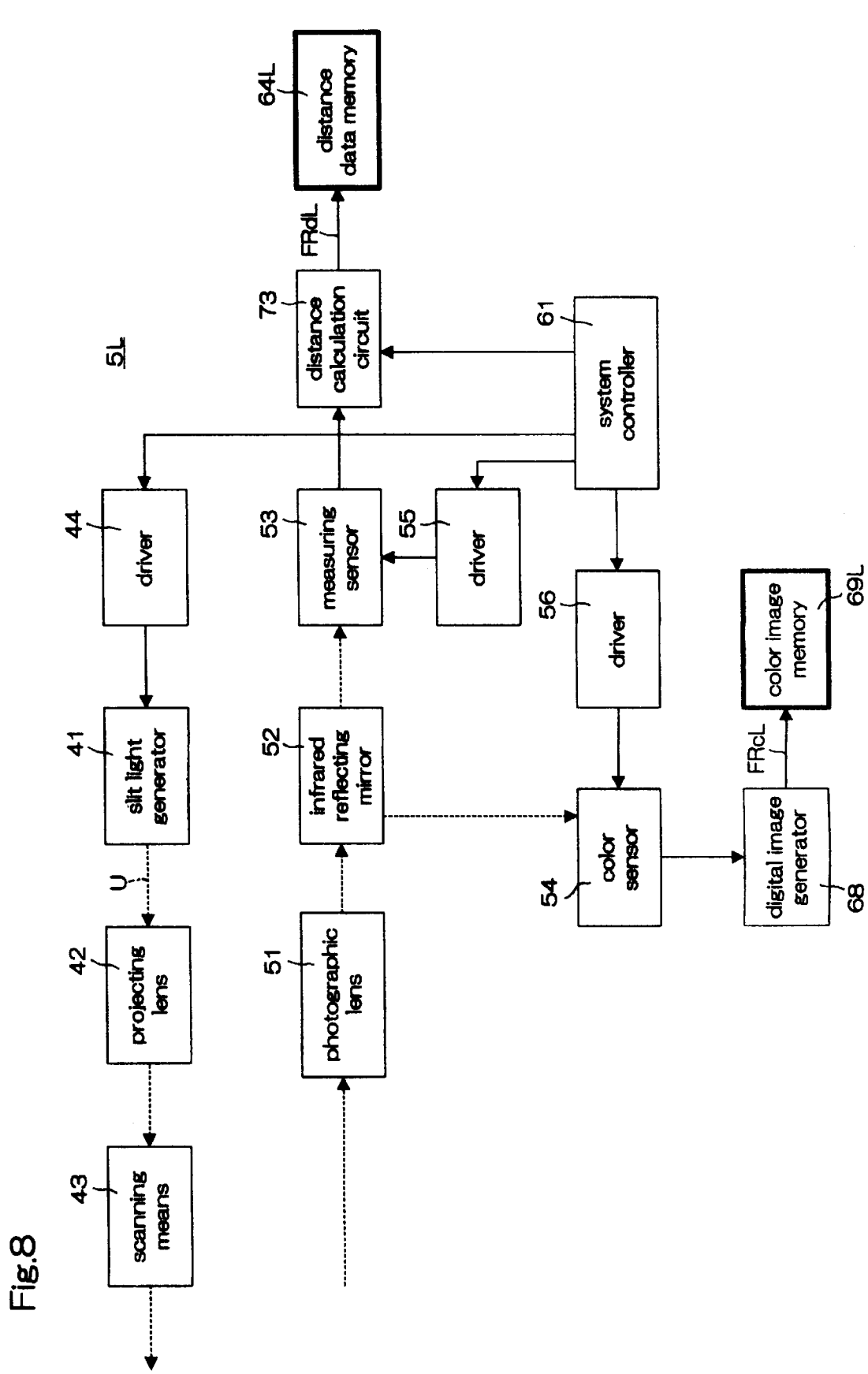
FIG. 8 is a block diagram of the functional structure of the distance detector.

FIG. 8 is a block diagram showing the functional structure of left eye measuring device 5L of HMD 3. In the drawing, the solid arrow represents the flow of electric signals, and the dashed arrow represents the flow of light.

Measuring device 5L includes image sensor 12L and slit projector UBL. In the projection side optical system of slit projector UBL, a laser beam in the infrared range emitted from a slit light generator 41 comprising a semiconductor laser passes through projector lens unit 42 and emerges as slit light U, and is deflected by scanner (galvano-mirror) 43. The drive mechanism (not illustrated) of driver 44 of slit light generator 41, projecting lens 42, and scanner 43 are controlled by a system controller 61.

In the optical system provided in image sensor 12L, Light condensed by photographic lens 51 such as a zoom unit or the like is split by infrared reflecting mirror (or beam splitter) 52. Light in the infrared range emitted from slit light generator 41 enters measuring sensor 53. Light in the visible range enters the monitoring color sensor 54. Measuring sensor 53 and monitoring color sensor 54 are both charge-coupled device (CCD) area sensors.

Image information from measuring sensor 53 is stored in memory synchronously with clock signals from driver 55, then output to distance calculation circuit 73. Image information from color sensor 54 is output to color processing circuit synchronously with clock signals from driver 56, and subsequently quantified by digital image generator 68, and stored in color image memory 69. Distance calculation circuit 73 calculates the distance information FRdL based on image information output from measuring sensor 53, and the distance information FRdL is stored in distance data memory 64L.

Figure 9:
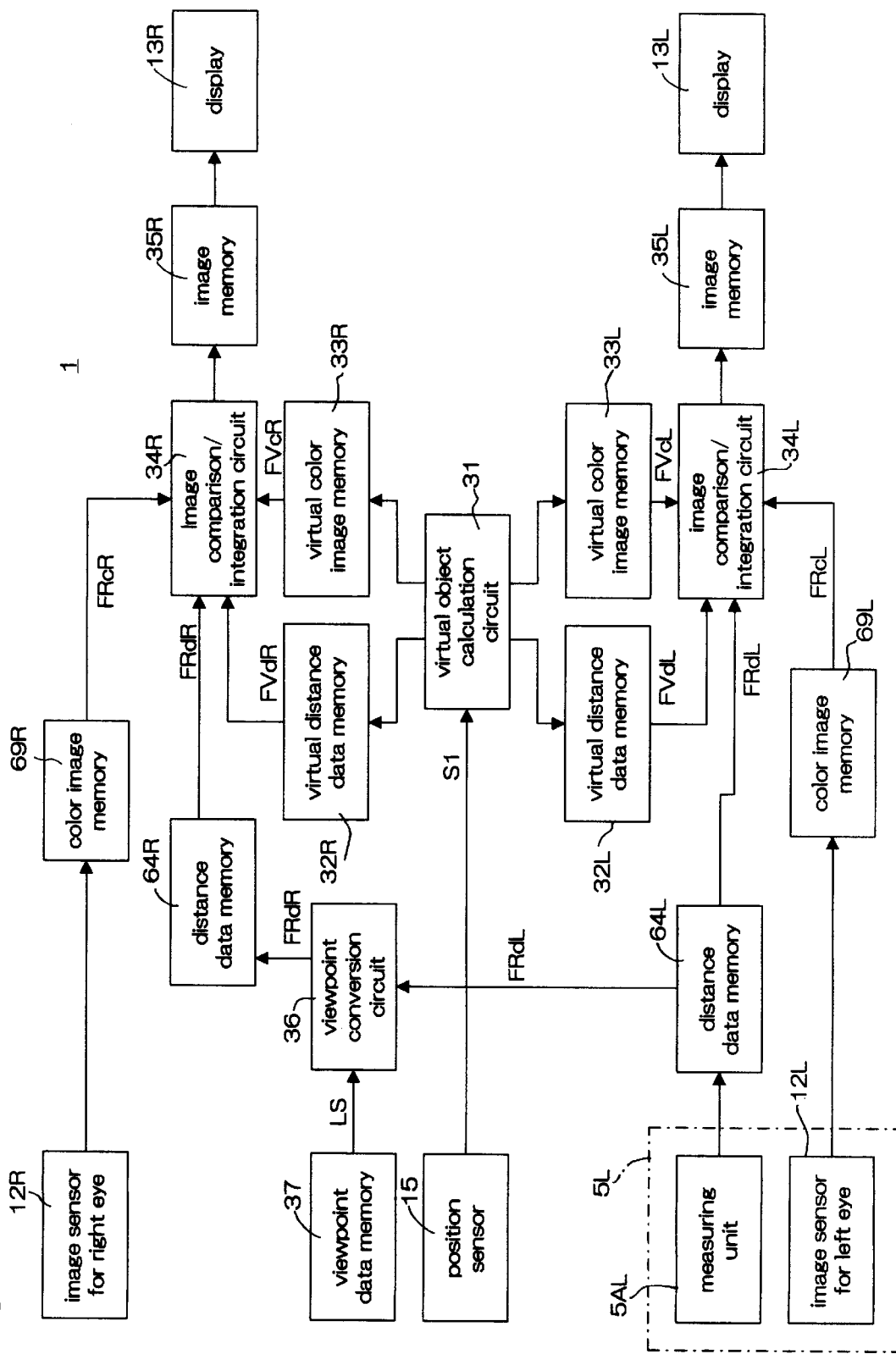
FIG. 9 a block diagram of all circuits of the display device.

FIG. 9 is a block diagram of all circuits of display device 1. Display device 1 is provided with distance unit 5AL, image sensor 12L, position sensor 15, color image memory 69L and 69R, distance data memory 64L and 64R, viewpoint data memory 37, viewpoint conversion circuit 36, image comparison/integration circuit 34L and 34R, virtual object calculation circuit 31, virtual distance data memory 32L and 32R, virtual color image memory 33L and 33R, image memory 35L and 35R, and display 13L and 13R. Distance unit 5AL and image sensor 12L comprise the distance device 5L.

Distance device 5L simultaneously produces distance information FRdL of each pixel and color information FRcL of the left eye. Image sensor 12L produces color information FRcR for the right eye. Viewpoint data memory 37, viewpoint conversion circuit 36, and display 13L and 13R have been described with reference to FIG. 2.

Virtual object calculation circuit 31 generates virtual object distance information FVdR and FVdL, and color information FVcR and FVcL based on the well known positional relationship between measuring sensor 53 and signal SI output from position sensor 15. The generated distance information FVdR and FVdL are stored in virtual distance data memory 32R and 32L, and color information FVcR and FVcL are stored in virtual color image memory 33R and 33L.

Image comparison/integration circuit 34R and 34L compare the measured distance information FRdR and FRdL and virtual object distance information FVdR and FVdL of each pixel, and specify the color information (color image) in the near direction as the integrated color information (composite image FM) of that pixel. The integrated color information is stored in image memory 35R and 35L, then displayed by displays 13R and 13L.

The virtual object calculation circuit 31, virtual distance data memory 32R and 32L, and virtual color image memory 33R and 33L shown in FIG. 9 are equivalent to the virtual space image output unit 16 of FIG. 3. Comparison/integration circuit 34R and 34L are equivalent to comparator 22 and selector 23.

The calculation process executed by viewpoint conversion circuit 36 is described below.

Figure 10:
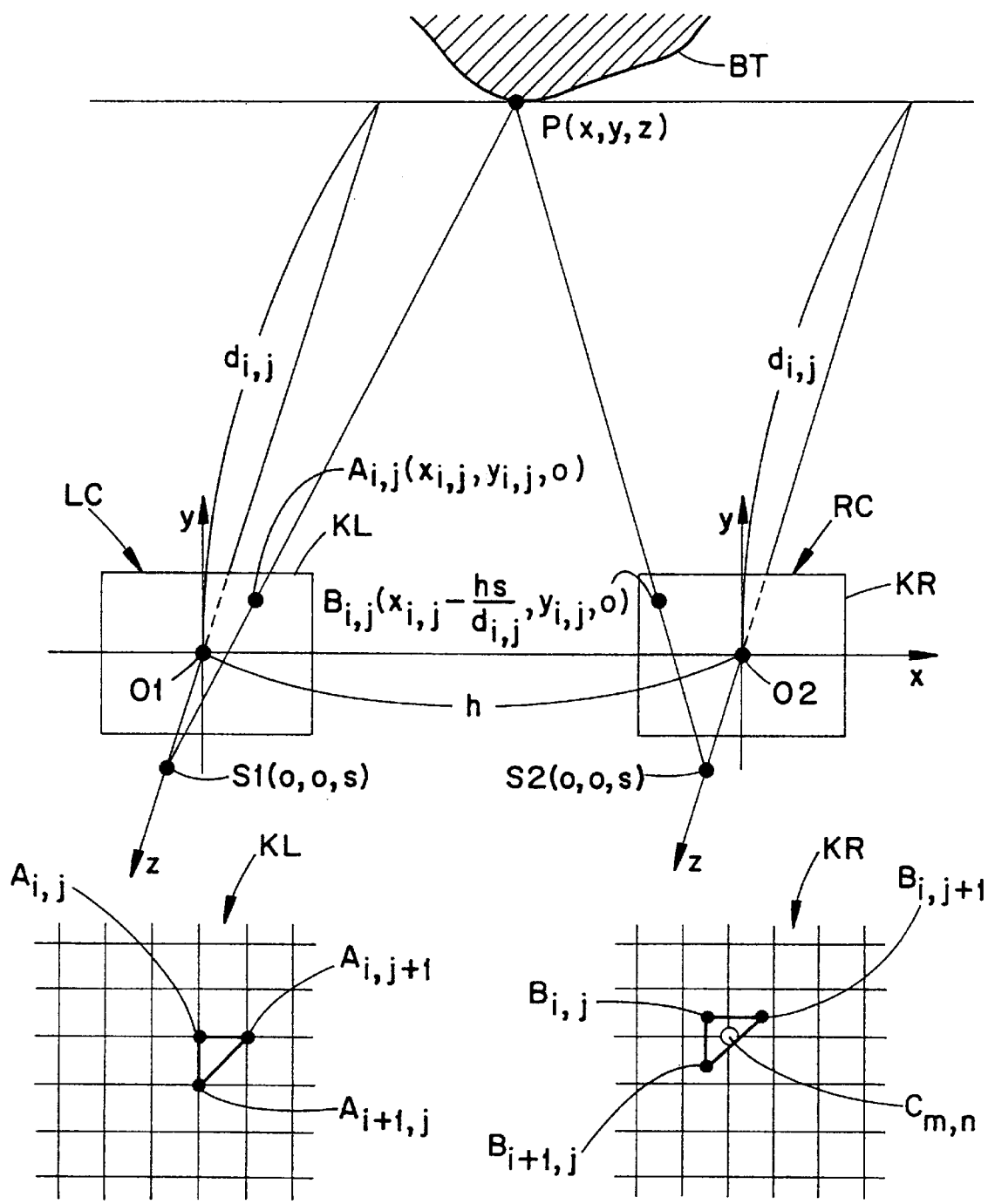
FIG. 10 illustrates the positional relationship between the display device and the viewed object.

FIG. 10 shows the positional relationship of HMD 3 and viewing object BT. The process of conversion of distance information FRdL measured by left measuring device 5L to distance information FRdR viewed from the right eye, to obtain a distance image viewed from image sensor 12R of the right eye is described below with reference to FIG. 10 and other drawings.

Observer BS wears HMD 3 and observes the viewing object BT. The coordinate systems of each image sensor 12L and 12R of display/image sensing units UAL and UAR are respectively designated the image sensing coordinate system LC of left eye EL and image-sensing coordinate system RC of right eye ER. In each image sensing coordinate system LC and RC, the left image plane KL and right image plane KR are defined.

Right image sensor 12R is disposed at a position moving horizontally a distance h in the X-axis direction from the position of left image sensor 12L. This information is stored in viewpoint data memory 37 as position information LS.

The origin points O1 and O2 of the image sensing coordinate systems LC and RC are set at the intersection of the optical axes of display/image sensing units UAL and UAR, and the xy coordinate plane of image sensing coordinate systems LC and RC.

The projection center S1 of left eye EL and the projection center S2 of the right eye ER are set at position (O,O,S) in image sensing coordinate systems LC and RC.

Coordinates of point P on viewing object BT corresponding to point $A_{i,j}$ ($X_{i,j}$, $Y_{i,j}$, 0) on left eye image plane KL becomes $P(X_{i,j}*d_{i,j}/S, Y_{i,j}*d_{i,j}/S, d_{i,j})$ from the law of similarity of triangles when the distance of point $A_{i,j}$ is designated $d_{i,j}$. The asterisk (*) denotes product calculation.

The coordinates of point $B_{i,j}$ on the right eye image plane KR when viewing point P from the right eye are $B_{i,j}$ ($X_{i,j}$-h*S/$d_{i,j}$, $Y_{i,j}$, 0) from the law of similarity of triangles.

When three adjacent points $A_{i,j}$, $A_{i,j+1}$, and $A_{i+1,j}$ on the left eye image plane KL correspond to points $B_{i,j}$, $B_{i,j+1}$, and $B_{i+1,j}$ on the right eye image plane KR, the distance data of the respective points become $d_{i,j}$, $d_{i,j+1}$, and $d_{i+1,j}$. The value $Z_{n,m}$ of the pixel $C_{m,n}$ ($p_{m,n}$, $q_{m,n}$, 0) on the right eye image plane KR within the triangle formed by the three points $B_{i,j}$, $B_{i,j+1}$, and $B_{i+1,j}$ can be expressed by the equations below.

$$Z_{n,m}=d_{i,j}+kt(d_{i,j+1}-d_{i,j})+k(1-t)(d_{i+1,j}-d_{i,j})$$

wherein $\overline{B_{i,j}C_{m,n}}=k(t\overline{B_{i,j}B_{i,j+1}}+(1-t)\overline{B_{i,j}B_{i+1,j}})$ In general, point B on the right eye image plane KR can be determined as B=STRP when the matrix of horizontal movement and rotational movement necessary to match the right eye image sensing coordinate system RC to the left eye image sensing coordinate system LC is designated T and R, and the perspective conversion matrix to convert the coordinate values on a three-dimensional plane is designated S.

In the aforesaid embodiment, only the left eye distance information FRdL is actually measured among the distance information FRd corresponding to left and right color information FRc; the right eye distance information FRdR is calculated by viewpoint conversion circuit 36 based on left eye distance information FRdL. Accordingly, only the left eye slit projector UBL is provided on HMD 3 to make the head-mounted display more compact. The construction and circuits are simplified since right eye image sensor 12R does not require a measuring sensor or distance unit 5AL. Furthermore, slit projector UBL and distance unit 5AL are provided only for the left eye, thereby making adjustment simple.

The distance information FRdR at points different from the measured distance information FRdL can be determined by coordinate conversion based on the measured distance information FRdL. That is, distance information is obtained to match the line of sight of the real space image (two-dimensional image) based on distance information from a position different than the line of sight of the real space image. Therefore, the slit projector UBL and distance unit 5AL can freely set the disposition position within the limit of obtaining the position information, thereby increasing the freedom of placement.

In the present embodiment, the real space image FR and the virtual space image FV can be fused by the electric signal level. Accurate distance information FRd is obtained for each pixel of a real space image (two-dimensional image), so as to accurately express a screening relationship. Since the real space image FR and measurement viewpoint and field of view of the distance information FRd and match the viewpoint and field of view of the observer, the real space image FR and the distance information (real space distance image) FRd match closely, and observer BS observed the AR image, i.e., composite image, without a feeling of uneasiness.

Since distance is determined from the viewpoint of the observer BS to obtain real space distance image FRd ad virtual space distance image FVd, matching of the positions real space distance image FRd and virtual space distance image FVd is unnecessary.

Other embodiments of the display device are described below.

Figure 11:
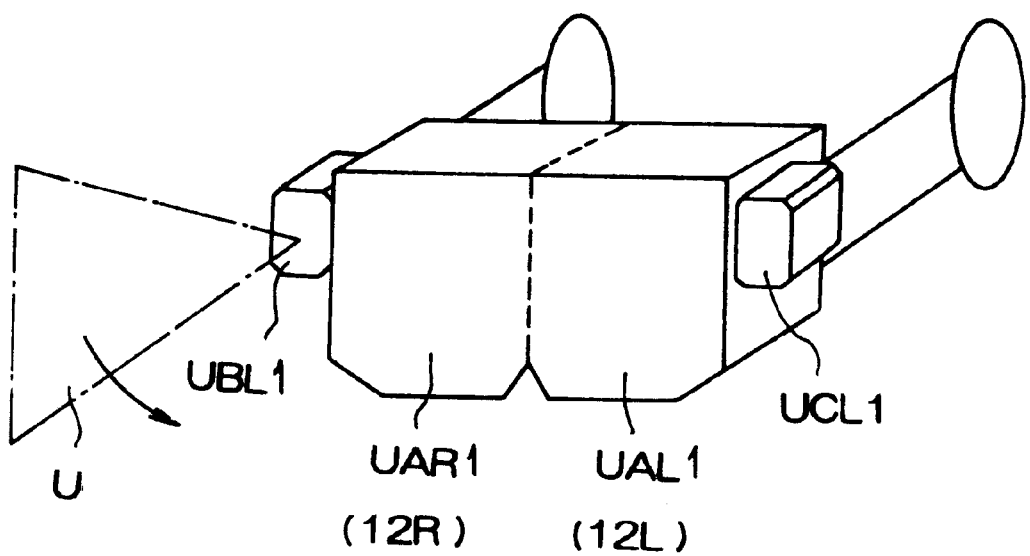
FIG. 11 is a perspective view of the exterior of another embodiment of the display device.

FIG. 11 is a perspective view of the exterior of HMD 4 using display device 2 of another embodiment.

As shown in FIG. 11, HMD 4 comprises left eye display/image sensing unit UAL1, right eye display/image sensing unit UAR1, left eye slit projector UBL1, and left eye slit light receptor UCL1.

The construction of the optical systems of left eye display/image sensing unit UAL1 and right eye display/image sensing unit UAR1 are both identical to the construction of the optical systems of right eye display/image sensing unit UAR of HMD 3. The construction of left eye slit projector UBL1 is identical to the left eye slit projector UBL of HMD 3.

Slit light U projected from slit projector UBL1 is received by left eye slit light receptor UCL1 disposed at the left endface of left eye display/image sensing unit UAL1.

Figure 12:
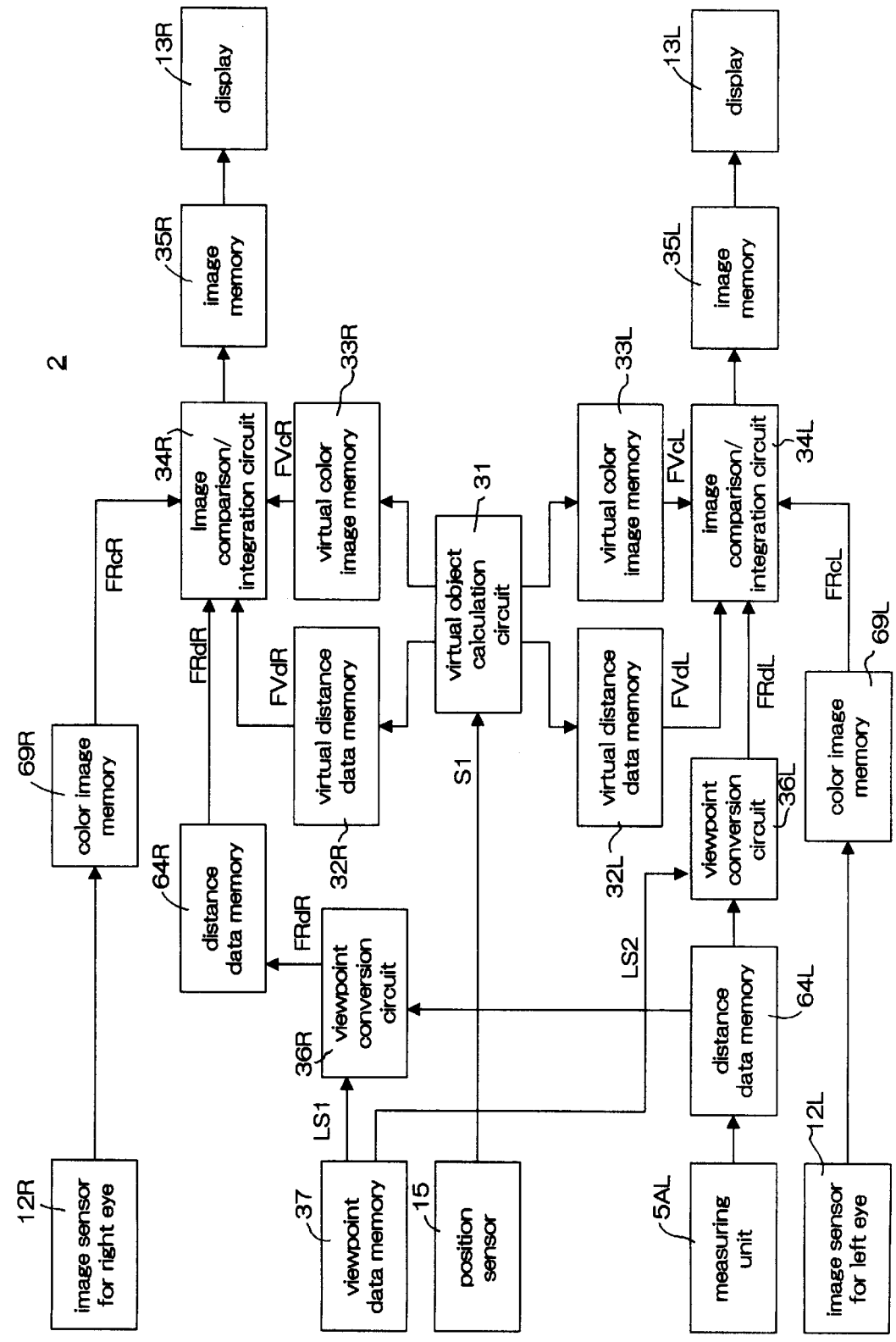
FIG. 12 is a block diagram of all the circuits of the display device of another embodiment.
Figure 13:
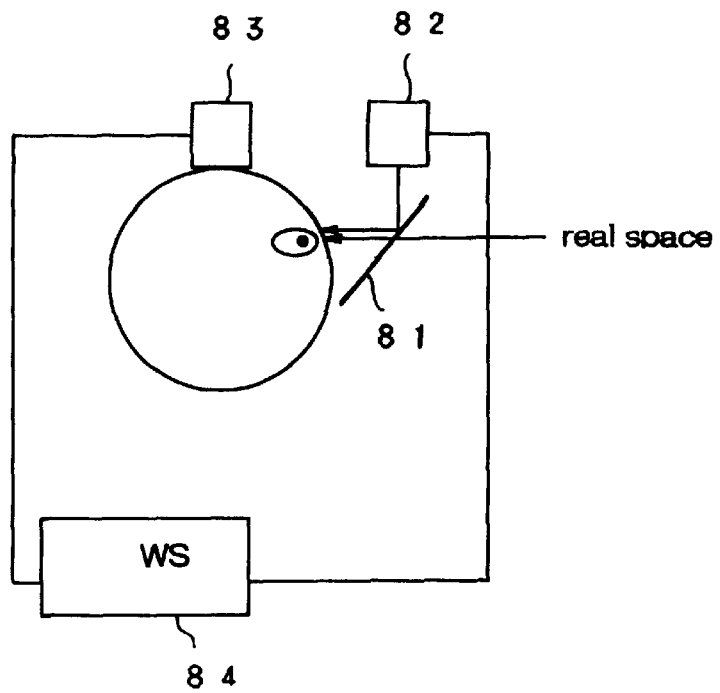
FIG. 13 illustrates the principle of the AR system of a conventional display device of the optical type.
Figure 14:
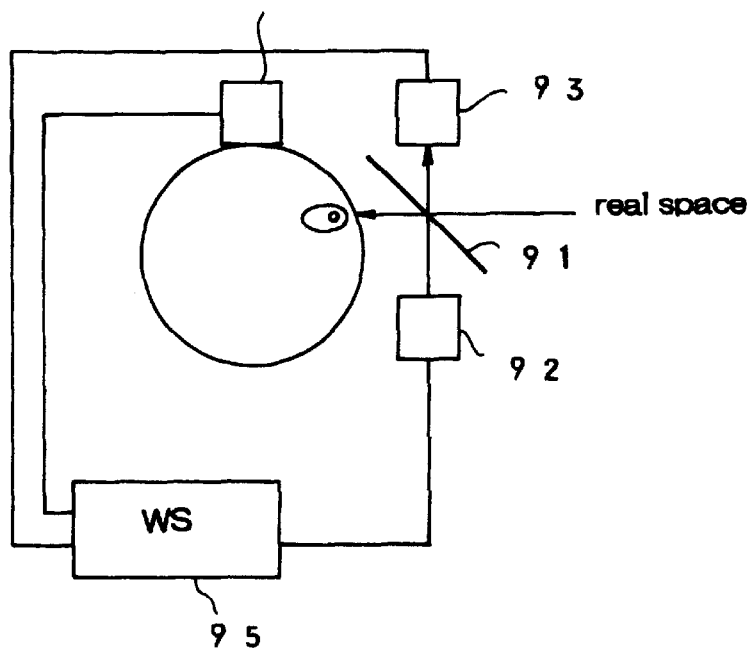
FIG. 14 illustrates the principle of an AR system of a conventional display device of the video type.
Figure 15:
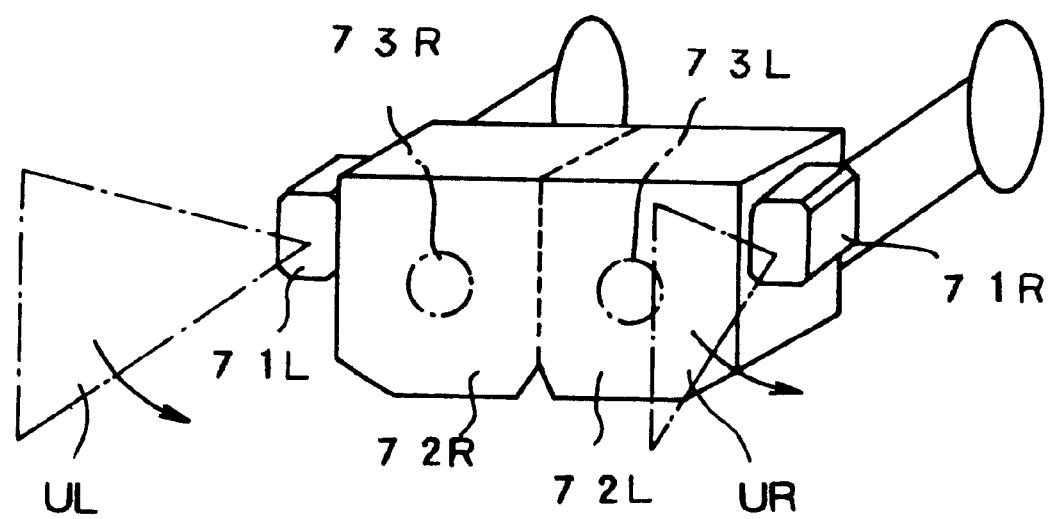
FIG. 15 is a perspective view of the exterior of a conventional display device.

FIG. 12 is a block diagram showing all circuits of display device 2.

Display device 2 is provided with left eye distance unit 5AL, image sensor 12L and 12R, position sensor 15, viewpoint data memory 37, color image memory 69L and 69R, distance data memory 64L and 64R, viewpoint conversion circuit 36R, image comparison/integration circuit 34L and 34R, image memory 35L and 35R, virtual object calculation circuit 31, virtual distance data memory 32L and 32R, virtual color image memory 33L and 33R, and display 13L and 13R similar to display device 1, and is further provided with a viewpoint conversion circuit 36L between distance data memory 64L and image comparison/integration circuit 34L.

Viewpoint conversion circuit 36L calculates distance information FRdL with corrected position discrepancy based on position information LS2 expressing the mutual positional relationship of the disposition position of left eye image sensor 12L and right eye slit light receptor UCl1.

Viewpoint conversion circuit 36 calculates FRdR from distance data stored in distance data memory 64L based on the positional relationship between the disposition position of right eye image sensor 12R and the disposition position of left eye slit light receptor UCL1 stored in viewpoint data memory 37.

In display device 2, the baseline length for measuring distance can be longer than that in HMD 3 because the distance between slit projector UBL and slit light receptor UCL1 can be widened.

In the previously described embodiment, color sensor 54 corresponds to the image sensor of the present invention, slit projector 18, slit projector UBL and UBL1, and measuring unit 5L including measuring sensor 53 correspond to the distance detector of the present invention, the viewpoint data memory 37 corresponds to the memory of the present invention, and the viewpoint conversion circuit 36 corresponds to the calculator of the present invention.

In the aforesaid embodiments, the various components, general structure, shape, arrangement, process content, process sequence, process timing and the like of measuring unit 5AL, image sensing unit 12, HMD 3 and HMD 4, display device 1 and display device 2 may be suitably modified insofar as such modification does not depart from the scope of the present invention.

According to the previously described embodiments, other required distance information can be generated based on distance information measured by a single distance detector, so as to obtain distance information matching the input line of sight of a two-dimensional image based on distance information from a position different from the entered line of sight of the two-dimensional image, thereby increasing the freedom of disposition of the distance detector.

Distance information for both eyes can be obtained from distance information measured by a distance detector provided near one eye, thereby providing a more compact head-mounted display. In this case, if a distance between the distance detector and the one eye is very close, distance information for the one eye may not be calculated. Then, the distance information from the distance detector to an object can be used as the distance between the one eye and the object.

Furthermore, accurate distance information can be obtained for each pixel of a two-dimensional image so as to produce accurate expression of the screening relationship.

Although the present invention has been fully described by way of examples with reference to the accompanying drawings, it is to be noted that various changes and modification will be apparent to those skilled in the art. Therefore, unless otherwise such changes and modifications depart from the scope of the present invention, they should be construed as being included therein.

What is claimed is:

1. A display device, comprising:
   an image sensor which senses an object to obtain a first two-dimensional image;
   a distance detector which measures a distance from a predetermined position to the object to obtain first distance information;
   a memory which stores position information expressing a mutual positional relationship of the predetermined position and a position of the image sensor;
   calculating means for calculating a distance from the position of the image sensor to the object based on the first distance information and the position information to provide second distance information;
   a viewpoint detector which detects a viewpoint of the image sensor to obtain viewpoint information;
   output means for outputting a third distance information corresponding to a second two-dimensional image and each point of the second two-dimensional image based on the viewpoint information and the position information;
   comparison means for comparing the second distance information and the third distance information of each pixel;
   selection means for selecting pixel data having the closer distance among the first two-dimensional image and the second two-dimensional image based on the output of the comparison means; and
   a display which displays the selected pixel data as a composite image.

2. A display device of claim 1, wherein the second two-dimensional image is a virtual image.

3. A display device comprising:
   first and second image sensing means for sensing an object, wherein
      the first image sensing means and the second image sensing means are separated by a predetermined distance,
      the first image sensing means is located in the vicinity of the right eye of an observer, and
      the second image sensing means is located in the vicinity of the left eye of the observer;
   measuring means for measuring a distance from the first image sensing means to a predetermined position on the object;
   calculating means for calculating a distance from the second image sensing means to the predetermined position based on the distance measured to the predetermined position;
   a first display which provides images for the right eye;
   a second display which provides images for the left eye;
   first display means for displaying a first image obtained by the first image sensing means on the first display;
   second display means for displaying a second image obtained by the second image sensing means on the second display;
   third display means for displaying a third image overlaid on the first image on the first display;
   fourth display means for displaying the third image overlaid on the second image on the second display;
   first control means for comparing the first distance information and distance information of the third image, and for selecting closer image data of the first and third images to be displayed on the first display; and second control means for comparing the second distance information and distance information of the third image, and for selecting closer image data of the second and third images to be displayed on the second display.

4. A display device of claim 3, wherein the third image is a virtual image.

5. A display device, comprising:

a first image sensor which senses an object to obtain a first image of the object;

a second image sensor separated from the first image sensor by a predetermined distance, and which senses the object to obtain a second image of the object;

a distance detector which measures a distance from the first image sensor to a predetermined position on the object to obtain a first distance information;

a calculator which calculates a distance from the second image sensor to the predetermined position on the object based on the distance from the first image sensor to the predetermined position on the object to provide second distance information;

a first display which displays the first image;

a first controller which controls the display of a third image overlaid on the first image on the first display, the first controller comparing the first distance information and distance information of the third image such that the closer image data of the first and third images is displayed on the first display;

a second display which displays the second image; and a second controller which controls the display of the third image overlaid on the second image on the second display, the second controller comparing the second distance information and distance information of the third image such that the closer image data of the second and third images is displayed on the second display.

6. A display device of claim 5, wherein the third image is a virtual image.

7. A display device of claim 5, wherein the first image sensor is located in the vicinity of the right eye of an observer and wherein the second image sensor is located in the vicinity of the left eye of the observer.

8. A display device, comprising:

a first image sensor which senses an object to obtain a first image of the object;

a second image sensor separated from the first image sensor by a predetermined distance, and which senses the object to obtain a second image of the object;

a distance detector which measures a first distance from the distance detector to a predetermined position on the object;

a first calculator which calculates a second distance from the first image sensor to the predetermined position on the object based on the first distance;

a second calculator which calculates a third distance from the second image sensor to the predetermined position on the object based on the first distance;

a first display which displays the first image;

a first controller which controls the display of a third image overlaid on the first image on the first display, the first controller comparing the second distance and distance information of the third image such that the closer image data of the first and third images is displayed on the first display;

a second display which displays the second image; and a second controller which controls the display of a third image overlaid on the second image on the second display, the second controller comparing the third distance and the distance information of the third image such that the closer image data of the second and third images is displayed on the second display.

9. A display device of claim 8, wherein the third image is a virtual image.

10. A display device of claim 8, wherein the first image sensor is located in the vicinity of the right eye of an observer and wherein the second image sensor is located in the vicinity of the left eye of the observer.

11. A display device, comprising:

an image sensor which senses an object to obtain a first two-dimensional image;

a distance detector which measures a distance from a predetermined position to the object to obtain first distance information;

a memory which stores position information expressing a mutual positional relationship of the predetermined position and a position of the image sensor;

a calculator which calculates a distance from the position of the image sensor to the object based on the first distance information and the position information to provide second distance information;

a viewpoint detector which detects a viewpoint of the image sensor to obtain viewpoint information;

an output unit which outputs a third distance information corresponding to a second two-dimensional image and each point of the second two-dimensional image based on the viewpoint information and the position information;

a comparator which compares the second distance information and the third distance information of each pixel;

a selector which selects pixel data having the closer distance among the first two-dimensional image and the second two-dimensional image based on the output of the comparator; and a display which displays the selected pixel data as a composite image.

* * * * *